Oct. 6, 1964
H. SCHMIDT ETAL
3,151,407
LAND PLANE
Filed May 28, 1962
2 Sheets-Sheet 1
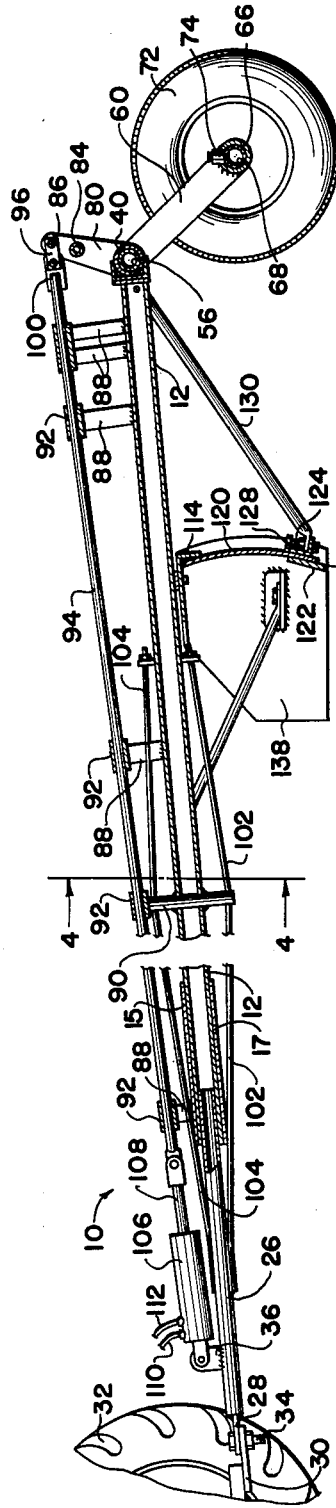
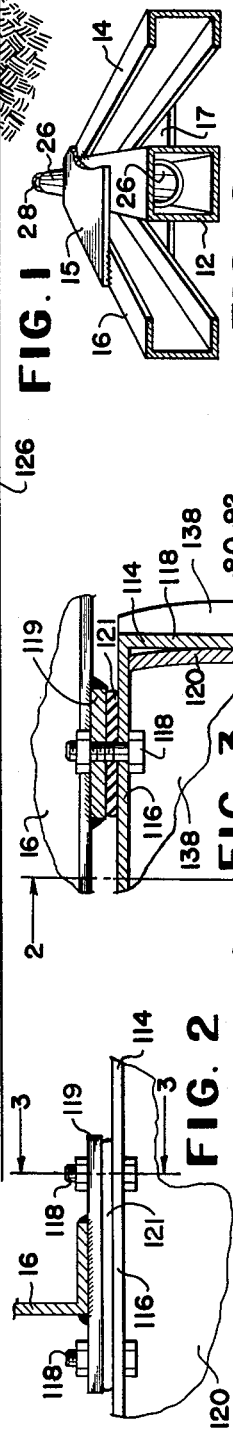
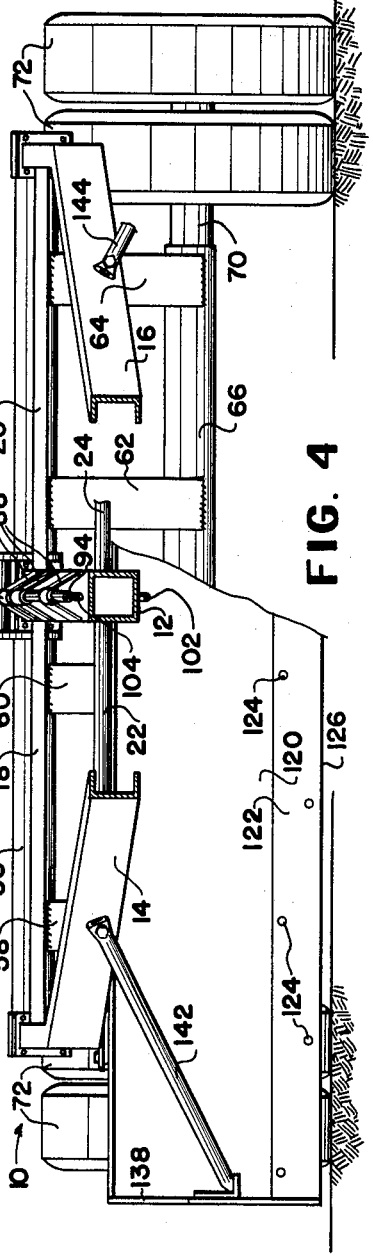
INVENTOR.
HAROLD SCHMIDT
HOWARD SCHMIDT
BY John H. Widdowson
ATTORNEY Oct. 6, 1964
H. SCHMIDT ETAL
3,151,407
LAND PLANE
Filed May 28, 1962
2 Sheets-Sheet 2
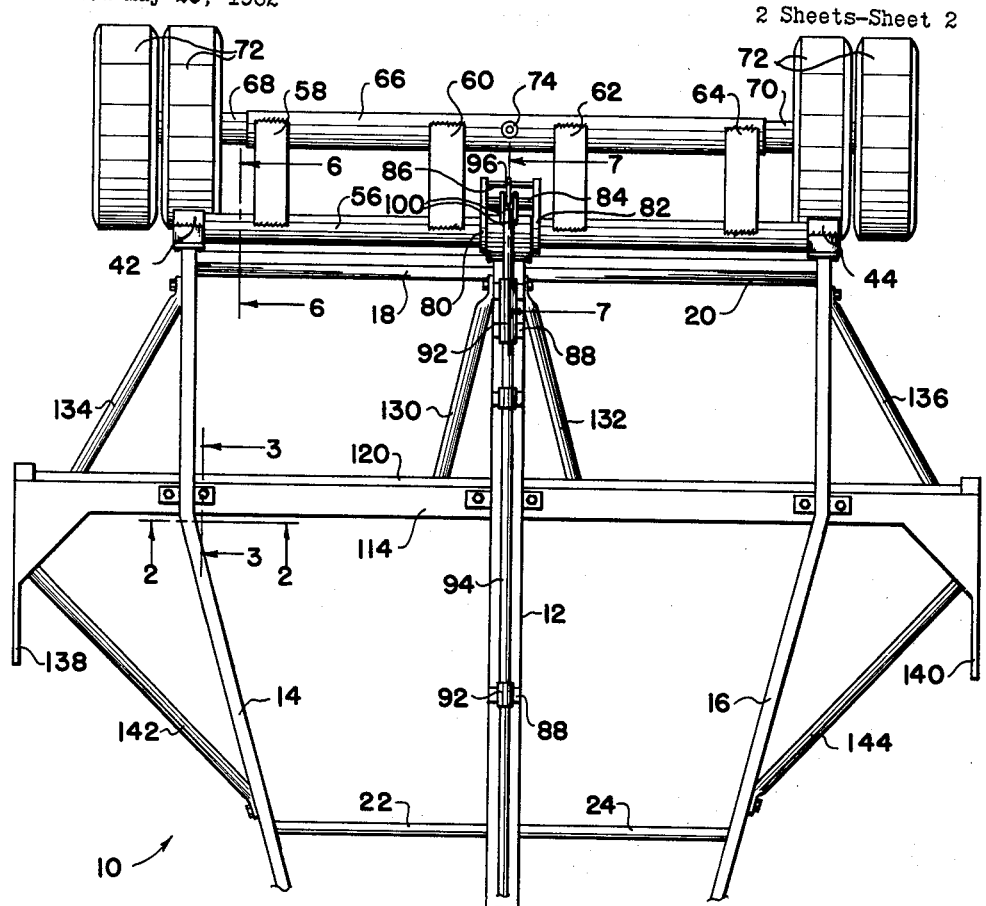
FIG. 5
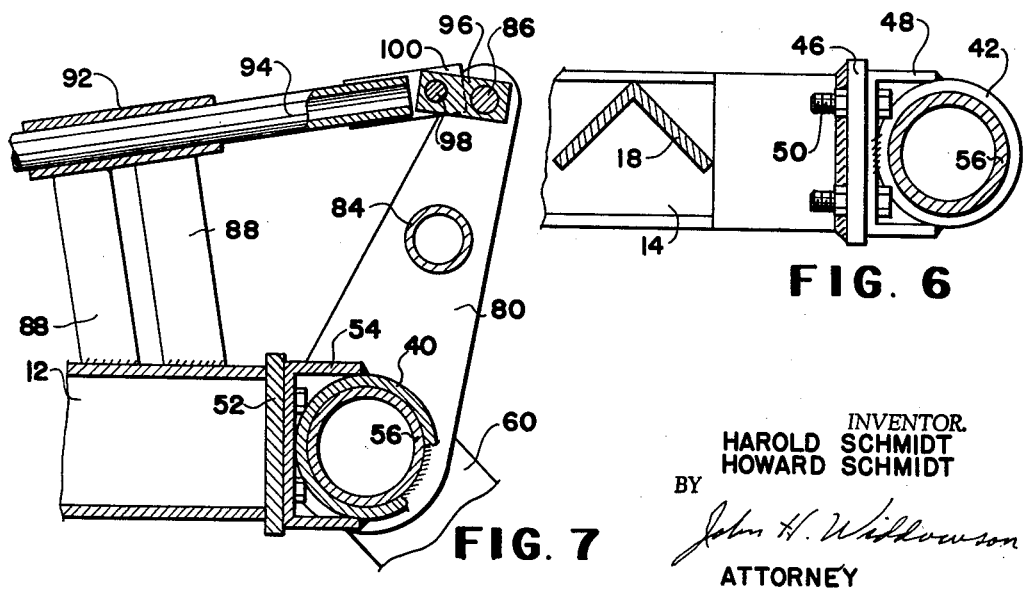
FIG. 6
FIG. 7
INVENTOR.
HAROLD SCHMIDT
HOWARD SCHMIDT
BY
John H. Widdowson
ATTORNEY P̃atented Oct. 6, 1964

3,151,407
LAND PLANE
Harold Schmidt and Howard Schmidt, Montezuma, Kans.
Filed May 28, 1962, Ser. No. 198,080
3 Claims. (Cl. 37—169)

This invention relates to land leveling means and in a more specific aspect to a land plane or the like. In another aspect the invention relates to a new land plane structure for pulling behind a vehicle in land levelling operation.

Various types of land leveling means are known to the art, including self-propelled grading devices or the like. These devices are unsatisfactory for use by the individual farmer or workman since they require a relatively large capital investment and are infrequently used. Other land-leveling means are known to the art but such require the power means to be mounted in a position remote from the pulling vehicle or the like and the control lines, hydraulic mechanism and the like therewith are then in a position to interfere with the working of the apparatus. Also, construction and mounting of the blade means in some instances is unsatisfactory and does not permit suitable operation of the land plane.

In accordance with the present invention new land leveling means are provided, which includes frame means. Shaft means are rotatably mounted on the frame means. Lever means are secured to the shaft means. Support means having ground engaging means are provided, preferably wheel support means, and wheel means are preferably mounted on the wheel support means. Arm means are secured to the shaft means and to the wheel support means to connect same together. Power means are positioned remote from the lever means, and connecting means are operatively connectable to the power means and connected to the lever means to move same in operation. Blade means are supported by the frame means and have a portion thereof engageable with the ground or the like in land leveling operations. Movement of the lever means by the power means causes height adjustment of the frame means and of the blade means attached thereto.

Accordingly, it is an object of the invention to provide new land leveling means.

Another object of the invention is to provide new land leveling means constructed to be pulled by a vehicle and having height adjustment means therewith.

Another object of the invention is to provide new land leveling means having blade means resiliently mounted on frame means, with the frame means and blade means being height-adjustable by power means during land leveling operation.

Another object of the invention is to provide new height-adjustable land leveling means whereby the power means is mounted on a frame means remote from lever means which control the height adjustment of the frame means and height adjustment of the blade means.

Various other objects, advantages and features of the invention will become apparent to those skilled in the art from the following discussion taken in conjunction with the accompanying drawings, in which:

FIG. 1 is a longitudinal cross section view taken through the center portion of a preferred specific embodiment of the land plane of the invention.

FIG. 2 is an enlarged partial cross section view taken along the lines 2—2 of FIGS. 3 and 5.

FIG. 3 is an enlarged partial cross section view taken along the lines 3—3 of FIGS. 2 and 5.

FIG. 4 is a transverse cross section view taken along the line 4—4 of FIG. 1 with a portion of the blade means being cut away.

FIG. 5 is a partial top plan view of the preferred specific embodiment of the land plane of the invention.

FIG. 6 is an enlarged partial cross section view taken along the line 6—6 of FIG. 5 and illustrating a portion of the frame means and mounting of shaft means thereon.

FIG. 7 is an enlarged partial cross section view taken along the line 7—7 of FIG. 5 illustrating the connecting means mounted on the lever means and the connection thereof to the shaft means whereby height adjustment is attained.

FIG. 8 is an enlarged partial cross section view illustrating the connection of the portions of the frame means at the forward portion of the frame.

The following is a discussion and description of a preferred specific embodiment of the new land plane of the invention, such being made with reference to the drawings whereon the same reference numerals are used to indicate the same or similar parts and/or structure. It is to be understood that such discussion and description is not to unduly limit the scope of the invention.

Referring now to the drawings in detail, the land plane of the invention is shown generally at 10 and provided with frame means which preferably includes an elongated and generally centrally located hollow center beam 12, which is generally rectangular in transverse cross section as shown in FIG. 4. The frame also desirably includes two elongated channel-shaped side frame members 14 and 16 which are positioned in mirror image relation on opposite sides of the center beam 12 and are substantially co-planar therewith. Each of the side frame members 14 and 16 is bent intermediate the ends thereof and is secured at one end portion to one end portion of the center beam 12 as best illustrated in FIG. 8 with the side frame members 14 and 16 diverging therefrom. Plates 15 and 17 are preferably secured to the members 12, 14 and 16 to aid in holding the frame means assembled. The other end portions of the side frame members 14 and 16 are positioned in generally parallel relation as best illustrated in FIG. 5, and are substantially equally spaced from the center beam 12.

Suitable cross frame members can be provided to rigidly connect the center beam 12 and the side frame members 14 and 16 in assembled relation. Preferably, two angle irons 18 and 20 are provided and the angle iron 18 is secured at its end portion to the other end portion of the center beam 12 and to the other end portion of the side frame member 14 with the angle iron 20 being substantially longitudinally aligned with the angle iron 18 and being secured at its end portions to the center beam 12 and the frame member 16. Two elongated and longitudinally aligned braces or cross frame members 22 and 24 are also preferably provided and are desirably secured at the end portions to the center beam 12 and to the side frame members 14 and 16, respectively, and are preferably connected to the side frame members in the inclined portion thereof.

A mounting post 26 is preferably provided and has one end portion telescopically received by one end portion of the center beam 12 with the main portion of the post 26 projecting therefrom and being substantially coaxially aligned therewith. A clevis or suitable hitch means 28 is secured to the other end of the portion of the mounting post 26 and cooperates with mounting means 30 on a pulling vehicle 32 to removably attach the land plane to the vehicle. Pin means 34 or other suitable fastening means can be used to connect the connecting means 30 and the hitch means 28 in assembled relation. The vehicle 32 can be a tractor, truck, or other suitable vehicle. A mounting flange 36 is preferably provided and is secured to the mounting post 26 and projects upwardly therefrom near the end portion thereof adjacent the vehicle 32.

Three cylindrical bearing sleeves of equal diameter are provided as shown at 40, 42 and 44, and are secured to the end portions of the center frame 12 and the side frame members 14 and 16, respectively, opposite from the mounting post 26. The bearing sleeves 40, 42 and 44 can be secured in position in any suitable manner, such as that shown in FIG. 6 where a plate 46 is welded or otherwise secured to the end of the channel-shaped member 14 and has a short channel-shaped member 48 extending transverse thereto and secured thereto by bolt means 50. The end portions of the channel iron 48 are welded or otherwise secured to the bearing sleeve 42 to thereby rigidly and removably mount the sleeve 42 on the end portion of the frame member 14. Likewise, a plate 52 can be secured to the center beam 12 and have bolted thereto a channel-shaped iron 54 which is welded or otherwise secured to the sleeve 40. The axes of the sleeves 40, 42 and 44 are preferably coaxial and the axis thereof is generally perpendicular to the axis of the center beam 12.

A tubular shaft 56 is received by and rotatably mounted in the sleeves 40, 42 and 44 and has four arms 58, 60, 62 and 64 each rigidly secured at one end portion thereto. The arms 58, 60, 62 and 64 are preferably positioned in spaced relation to each other and are generally parallel and aligned with each other.

Wheel support means are provided and such is desirably constructed of a tubular member 66 which is rigidly secured to the other end portion of each of the arms 58, 60, 62 and 64. Two axles 68 and 70 are mounted in the end portions of the tubular member 66 and project from the ends thereof, and suitable wheel means 72 are rotatably mounted on the axles 68 and 70 to movably mount the land plane. If desired, a single axle can be used and extended entirely through the tubular member 66 and a suitable grease fitting 74 can be provided for lubricating the axle.

Two lever arms 80 and 82 are each rigidly secured at one end portion to the shaft 56 for movement therewith and are desirably positioned on opposite sides of the sleeve 40 connected to the center beam 12. A brace or fastening member 84 is secured at its intermediate portions to an intermediate portion of the lever arms 80 and 82 and a rod 86 is secured at its end portions to the outer end portions of the lever arms.

A plurality of guide supports 88 are secured to the center beam 12 and are positioned in spaced and substantially longitudinally aligned relation. One of the guide supports, as shown at 90 in FIG. 1, preferably extends through the center beam 12 and projects above and below same.

A plurality of cylindrical guides 92 are preferably provided and secured to the upper end portion of the guide supports 88 and 90, and are desirably of the same diameter and positioned in coaxial relation. A connecting rod 94 is provided and has the intermediate portion thereof slideably positioned in the guides 92. A linking member 96, FIG. 7, is pivotally connected at one end portion to the bar or rod 86 on the lever arms 80 and 82, and is connected at its other end portion to the pivot 98 which extends between and is connected to pivot support members 100 which are secured to the end portion of the connecting rod 94.

Two braces 102 and 104 are each secured at intermediate portions to the end portions of the guide support 90 and have the end portions thereof mounted on the center beam 12 of the frame, the members 102 and 104 being disposed on opposite sides of the frame. Braces 102 and 104 are desirable in that they add rigidity to the frame means and substantially prevent any tendency of same to buckle or bend intermediate the end of the relatively long center beam 12.

Power means are provided and such preferably includes a double-acting servo-motor 106 which is pivotally mounted at one end portion on the mounting flange 36 on the mounting post 26 and has the piston rod 108 thereof projecting from the other end thereof and is pivotally connected to the connecting rod 94. Operation of the servo-motor 106 extends and retracts the piston rod 108 and causes sliding movement of the connecting rod 94 in the guides 92 and thus causes movement of the lever arms 80 and 82. Hydraulic fluid is provided to the servo-motor 106 through conduits 110 and 112, which are in turn connected to a suitable source of fluid, such as the hydraulic system of the pulling vehicle.

Blade means are mounted on the frame means and have a portion thereof engageable with the ground in land leveling operation. The preferred construction of the blade means includes an elongated blade support member 114 which is positioned transverse to the frame means and is connected to the center beam 12 and the side frame members 14 and 16. The preferred mounting of the blade support 114 on the frame members is best illustrated in FIGS. 2 and 3 of the drawings, wherein the upper and relatively flat edge portion 116 of the blade support member 114 has bolt means 118 passing therethrough and through a flange or mounting plate 119 which is welded to or otherwise secured to the frame members and preferably projects from the sides thereof as shown. Desirably, a resilient pad or member 121 is positioned between the plate 119 and the portion 116 of the blade support member to thereby resiliently mount the blade support member. The blade support member 114 has a portion 118 projecting downwardly from the portion 116 as best illustrated in FIG. 3 and an elongated blade base 120 is secured along one longitudinal edge portion thereof to the portion 118 of the blade support member. The blade base 120 is generally arcuate in transverse cross section as best illustrated in FIG. 1 and a blade 122 is secured to the lower longitudinal edge of the blade base 120. The blade 122 can be removably secured in position by bolts 124 or rigidly mounted by welding or other suitable means. Preferably the blade 122 has a relatively sharp lower edge portion 126 which is engageable with the ground or the like in use. Bolt 124 can also be used to mount a channel-shaped member 128, FIG. 1, on the blade base and two blade braces 130 and 132 are secured at one end portion to the channel-shaped member 128 and are connected at the other end portion to the center beam 12. Two additional blade braces 134 and 136 are preferably provided and are secured to the end portions of the blade base 120, such as by connecting same to the channel-shaped member 128, and each are secured at the other end portions to the side frame members 14 and 16, respectively.

Preferably the end portions of the blade are closed by two side plates 138 and 140 which are desirably positioned in generally parallel planes and project forwardly of the blade base 120. Two plate braces 142 and 144 are provided and are secured at the end portions thereof to the plates 138 and 140, respectively, and to the side frame members 14 and 16, respectively. The braces 142 and 144 preferably extend forwardly of the blade while the other braces 130, 132, 134 and 136 are positioned rearwardly of the blade and thus the blade is supported on both sides thereof and is relatively rigidly mounted with the resilient member 122 providing for a desirable amount of flexing or give to the blade during land planing operations.

In operation the land plane of the invention is connected to a pulling vehicle 32 by connection of the hitch means 28 with the connecting means 30 of the vehicle and by connecting the conduits or hoses 110 and 112 to hydraulic fluid pressure means so that operation of the servo-motor 106 can be accomplished. The blade edge 126 is adjusted to the desired height by operation of the servo-motor 106 which extends and retracts the piston rod 108 thereof to reciprocate the connecting means 94 in the guides 92 to cause movement of the lever arms 80 and 82 of the shaft 56. Movement of the lever arms and the shaft also causes movement of the arms 58, 60, 62 and 64 about the axis of the tubular member 66 and the entire frame is thus raised and lowered by operation of the servo-motor. Movement of the frame does, of course, also elevate and lower the blade structure to place same in the desired contact with the ground during planing operations. Controls for the hydraulic mechanism can be located on the tractor or other pulling vehicle 32 so that the operator can accomplish adjustment of the blade during movement of the vehicle and land plane which is most desirable. The resilient mounting of the blade structure permits slight movement of the blade in use without damage to the blade or land plane structure. This is quite desirable where relatively large and immovable objects such as stones, foundations, etc. are inadvertently engaged by the blade in operation.

While the invention has been described in connection with a preferred specific embodiment thereof, it will be understood that this description is intended to illustrate and not to limit the scope of the invention, which is defined by the claims.

We claim:

1. A land plane comprising, in combination, a frame including an elongated centrally located hollow center beam and two elongated channel shaped side frame members positioned in mirror image relation on opposite sides of said center beam and in substantially coplanar relation therewith, each of said side frame members being bent intermediate the ends thereof and secured at one end portion to one end portion of said center beam and diverging therefrom with the other end portion of said side frame members being in generally parallel relation and spaced from said center beam, two elongated angle irons, one of said angle irons being secured at the end portions thereof to the other end portion of said center beam and to said other end portion of one of said side frame members and the other of said angle irons being longitudinally aligned with said one of said angle irons and longitudinally secured at the end portions thereof to said other end portion of said center beam and to said other end portion of the other of said side frame members, two elongated and longitudinally aligned braces each secured at one end portion to an intermediate portion of said center beam, the other end portion of one of said braces being secured to an intermediate portion of said one of said side frame members and the other of said braces being secured to an intermediate portion of said other of said side frame members, a mounting post telescopically received in one end portion by said one end portion of said center beam, hitch means on the other end portion of said mounting post operable to connect said land plane to a pulling vehicle, a mounting flange on an intermediate portion of said mounting post, three cylindrical bearing sleeves of equal diameter, said sleeves being mounted on said other end portions of said center beam and said side frame members in coaxial relation with the axis thereof being generally perpendicular to the axis of said center beam, a tubular shaft rotatably mounted in said sleeves, four elongated arms each rigidly secured at one end portion to said shaft in spaced relation to each other and to said sleeves, an elongated tubular member rigidly secured to the other end portion of each of said arms, two axles mounted in the end portions of said tubular member and projecting from the ends thereof, wheel means rotatably mounted on the end portions of said axles, two lever arms each rigidly secured at one end portion to said shaft and positioned on opposite sides of said sleeve on said center beam, a rod extending between and rigidly secured to the other end portions of said lever arms, a plurality of guide supports secured to said center beam in spaced and longitudinally aligned relation with one of said guide supports extending through an intermediate portion of said center beam, a plurality of cylindrical guides mounted on said guide supports and positioned in coaxial relation, a connecting rod slideably mounted in said guides, a linking member pivotally connected at its end portions to said rod on said lever arms and to one end portion of said connecting rod to move said lever arms upon movement of said connecting rod, two braces secured at an intermediate portion to the end portions of said one of said guide supports and each secured at the end portions to said mounting post and to said intermediate portion of said center beam, a double acting servo-motor pivotally mounted at one end portion on said mounting flange on said mounting post and having the piston rod thereof projecting from the other end portion thereof and connected to the other end portion of said connecting rod, an elongated blade support member positioned transverse to said frame and having an edge portion resiliently mounted on the bottom of said center beam and to said side frame members and extending to the sides thereof with another edge portion projecting downwardly therefrom, an elongated blade base secured at one longitudinal edge portion to said other edge portion of said blade support, a blade secured to the other longitudinal edge of said blade support, two elongated blade braces each secured at the end portions thereof to said center beam and to the center portion of said blade base, two other elongated blade braces secured to opposite end portions of said blade base and to said side frame members, two side plates secured to opposite end portions of said blade base and positioned in generally parallel planes, two plate braces secured at the end portions to said plates and to said side frame members, said land plane being constructed and adapted so that operation of said servo-motor moves said connecting rod to move said lever arm and rotate said shaft to move said tubular member and said arms secured thereto about said axles to raise and lower said other end portion of said frame and said blade during leveling of ground engaged by said blade.

2. A land plane comprising, in combination, frame means including a center frame member and two side frame members secured thereto at one end portion thereof and positioned in spaced relation thereto at the other end portion thereof, a shaft rotatably mounted on said other end portion of said center frame member and said side frame members, hitch means operatively connected to said one end portion of said frame means and operable to connect said frame means to a vehicle, a plurality of arm members rigidly secured at one end portion to said shaft and positioned in spaced relation to each other, a tubular member secured to the other end portion of said arm members, axle means rotatably mounted in said tubular member, wheel means mounted on said axle means to moveably support said land plane, lever arm means rigidly secured at one end portion to said shaft and positioned adjacent said center frame member, a plurality of guide members operatively connected to said center frame member and positioned in spaced relation thereon, a connecting rod slideably mounted in said guide members and operatively connected at one end portion to said lever arm, power means operatively connected to said one end portion of said frame means and operatively connected to the other end portion of said connecting rod to move same to cause movement of said lever arm and said shaft to raise and lower said other end portion of said frame means relative to said wheel means, blade means resiliently supported by said frame means and extending transverse thereto and positioned therebeneath, said blade means having a relatively sharp blade edge portion extending thereacross and engageable with the ground or the like in use, said land plane being constructed and adapted to be pulled by a vehicle or the like with said blade means in engagement with the ground in leveling relation thereto and with said power means operable to move said connecting rod to adjust the height of said frame means and said blade means.

3. A land plane comprising, in combination, frame means including a center frame member and two side frame members secured thereto at one end portion thereof and positioned in spaced relation thereto at the other end portion thereof, a shaft transversely and rotatably mounted on said other end portion of said center frame member and said side frame members, hitch means operatively connected to said one end portion of said frame means and operable to connect said frame means to a vehicle, a plurality of arm members each rigidly secured at one end portion to said shaft and positioned in spaced relation to each other, axle means having end portions to receive and mount wheel means and mounted substantially parallel to said shaft with an end portion of said axle means at each of the outer portions of said other end portion of said frame means, the other end portions of said arm members secured to said axle means with each of said end portions of said axle means having at least one arm member secured thereto, wheel means mounted on each of said end portions of said axle means to movably support said land plane, lever arm means rigidly secured at one end portion to said shaft and positioned adjacent said frame means, a plurality of guide members operatively mounted on said frame means and positioned in spaced relation thereon, a connecting rod slideably mounted in said guide members and operatively connected at one end portion to said lever arm, power means operatively connected to said one end portion of said frame means and operatively connected to the other end portion of said connecting rod to move same to cause movement of said lever arm and said shaft to raise and lower said other end portion of said frame means relative to said wheel means, blade means resiliently supported by said frame means and extending transverse thereto and positioned therebeneath, said blade means having a relatively sharp blade edge portion extending thereacross and engageable with the ground or the like in use, said land plane being constructed and adapted to be pulled by a vehicle or the like with said blade means in engagement with the ground in leveling relation thereto and with said power means operable to move said connecting rod to adjust the height of said frame means and said blade means.

References Cited in the file of this patent

UNITED STATES PATENTS

| | | |
|---|---|---|
| 1,547,139 | Snyder | July 21, 1925 |
| 1,759,982 | Hauser | May 27, 1930 |
| 2,202,929 | Silver | June 4, 1940 |
| 2,254,414 | Bowlin | Sept. 2, 1941 |
| 2,595,289 | Peterson | May 6, 1952 |
| 2,681,519 | Potter | June 22, 1954 |
| 2,867,827 | Gantz | Jan. 13, 1959 |

OTHER REFERENCES

John Deere Operator's Manual Number OM-Y25-1253 entitled "No. 290 and No. 310 Landshapers," published by the John Deere Tractor Co., Moline, Ill.